(12) United States Patent
Chibisov et al.

(10) Patent No.: US 9,448,977 B2
(45) Date of Patent: Sep. 20, 2016

(54) WEBSITE BLUEPRINT GENERATION AND DISPLAY ALGORITHMS TO REDUCE PERCEIVED WEB-PAGE LOADING TIME

(75) Inventors: Valeriy Chibisov, Toronto (CA); Enrico Ros, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 586 days.

(21) Appl. No.: 13/594,686

(22) Filed: Aug. 24, 2012

(65) Prior Publication Data
US 2014/0059421 A1 Feb. 27, 2014

(51) Int. Cl.
*G06F 17/22* (2006.01)
*G06F 17/30* (2006.01)

(52) U.S. Cl.
CPC ..... *G06F 17/2247* (2013.01); *G06F 17/30902* (2013.01)

(58) Field of Classification Search
CPC .................................... G06F 17/2247
USPC ......... 700/121; 715/234, 736, 726; 713/153; 345/531
See application file for complete search history.

(56) References Cited

U.S. PATENT DOCUMENTS

| | | | |
|---|---|---|---|
| 8,156,419 B2 | 4/2012 | Choudhary et al. | |
| 8,977,653 B1* | 3/2015 | Mahkovec et al. | 707/802 |
| 2013/0021354 A1* | 1/2013 | Van Eerd et al. | 345/531 |

* cited by examiner

*Primary Examiner* — Tejal Gami
(74) *Attorney, Agent, or Firm* — Neugeboren O'Dowd PC

(57) ABSTRACT

This disclosure describes systems, methods, and apparatus for decreasing apparent webpage pageload times. In particular, drawing commands used to render a webpage can be saved, and a subset of the drawing commands (a blueprint) can be stored in a memory of a user device. When the user device again requests download of the webpage, the blueprint can immediately load while the full webpage downloads, processes, and renders in parallel thereto. In this way, the user sees the blueprint immediately rather than being faced with a blank screen while the download and pageload take place.

27 Claims, 3 Drawing Sheets

WEBSITE BLUEPRINT GENERATION AND DISPLAY ALGORITHMS TO REDUCE PERCEIVED WEB-PAGE LOADING TIME

FIELD OF THE DISCLOSURE

The present disclosure relates generally to web page loading and rendering. In particular, but not by way of limitation, the present disclosure relates to systems, methods and apparatuses for creating a perception that a webpage loads faster than the actual loading time.

BACKGROUND

One of the major components in web-browsing, and especially mobile web-browsing, which affects overall user experience is page loading time. Page loading time is the time between a user clicking on a link or URL and the moment that a user device renders a first pixel to the display. This process often involves a series of domain name servers identifying an IP address of a web server associated with the link or domain that the user selected or entered followed by a request to the web server for a webpage. The data used by the user device to render the webpage is then downloaded to the user device, processed, and finally rendered to the display. This series of steps, even if partially carried out in parallel, takes time and degrades the user experience to the point that some users do not wait for a slow page to load entirely, but rather move on to another web page. There is therefore a need for faster pageloads or at least the appearance of faster pageloads.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some aspects of the disclosure may be characterized as a user device having a network interface, a display, a memory, and a blueprint control module. The network interface can receive data packets corresponding to a webpage in response to a request for the webpage. The display can display the webpage. The memory can a plurality of blueprint drawing commands, wherein one set of blueprint drawing commands corresponds to a blueprint of the webpage as previously downloaded, the set of blueprint drawing commands corresponding to the blueprint is a subset of drawing commands that excludes drawing commands for content. The blueprint control module can search for the set of blueprint drawing commands corresponding to the blueprint. The blueprint control module can also determine that the set of blueprint drawing commands corresponding to the blueprint is stored in the memory. The blueprint control module can further render to a display the blueprint via executing the set of blueprint drawing commands corresponding to the blueprint. The blueprint control module can also process drawing commands extracted from the data packets, render the drawing commands to the display, and record the drawing commands to the memory. The blueprint control module can finally remove drawing commands for content from the drawing commands in the memory to leave a subset of the drawing commands, the subset being referred to as an updated set of blueprint drawing commands.

Other aspects of the disclosure may also be characterized as a method of downloading webpages to a user device. The method can include searching for corresponding blueprint drawing commands in a memory of the user device. The method can further include determining that the corresponding blueprint drawing commands do not exist in the memory. The method can additionally include processing first drawing commands from the first data packets. Also, the method may include rendering the first drawing commands to a display of the user device. The method may further include recording the first drawing commands to the memory. At the same time, the method can include removing drawing commands for content from the first drawing commands in the memory to leave the corresponding blueprint drawing commands, wherein the corresponding blueprint drawing commands, when executed, will render a blueprint of the webpage.

Other aspects of the disclosure can be characterized as a non-transitory, tangible computer readable storage medium, encoded with processor readable instructions to perform a method for downloading webpages to a user device. The method can include receiving first data packets corresponding to a webpage in response to a first request for the webpage. Additionally, the method can include searching drawing commands for content from the first drawing commands in the memory to leave the corresponding blueprint drawing commands, wherein the corresponding blueprint drawing commands, when executed, will render a blueprint of the webpage. The method can further include determining that the corresponding blueprint drawing commands do not exist in the memory. Also, the method can include processing first drawing commands from the first data packets. The method may further include rendering the first drawing commands to a display of the user device. The method can also include recording the first drawing commands to the memory. Finally, the method can include removing drawing commands for content from the first drawing commands to leave a subset of the first drawing commands, the subset being referred to as an updated set of blueprint drawing commands.

Other aspects of the disclosure can be characterized as a system having various means for rendering blueprint drawing commands. The method may include means for receiving data packets corresponding to a webpage in response to a request for the webpage. The method may include means for searching for corresponding blueprint drawing commands in a memory of the user device. The method may further include means for determining that the corresponding blueprint drawing commands exist in the memory. The method may include means for rendering the corresponding blueprint drawing commands to a display of the user device. The method may include means for processing drawing commands extracted from the data packets. The method may additionally include means for rendering the drawing commands to the display. The method may include means for recording the drawing commands to the memory. Also, the method may include means for removing content drawing commands from the memory to leave updated blueprint drawing commands.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The present disclosure relates generally to web page loading and rendering. In particular, but not by way of limitation, the present disclosure relates to systems, methods and apparatuses for creating a perception that a webpage loads faster than the actual loading time.

The word "exemplary" is used herein to mean "serving as an example, instance, or illustration." Any embodiment described herein as "exemplary" is not necessarily to be construed as preferred or advantageous over other embodiments.

Web pages are typically rendered via a combination of images, text, geometries, and other visual elements. This rendering often utilizes a graphics library, such as, for example, the Skia library for ANDROID. However, bitmaps and text often take significantly longer than other webpage elements to process and render and thus add the greatest delays to pageload times. By contrast, a "blueprint" of a webpage, which excludes content (e.g., images and text), can be rendered almost instantly to produce an initial view of a webpage while the full webpage is processed and rendered in the background and gradually replaces the blueprint on a display. The blueprint can therefore give a user the perception of a faster pageload and/or help retain the user's attention during longer pageloads.

Figure 1:
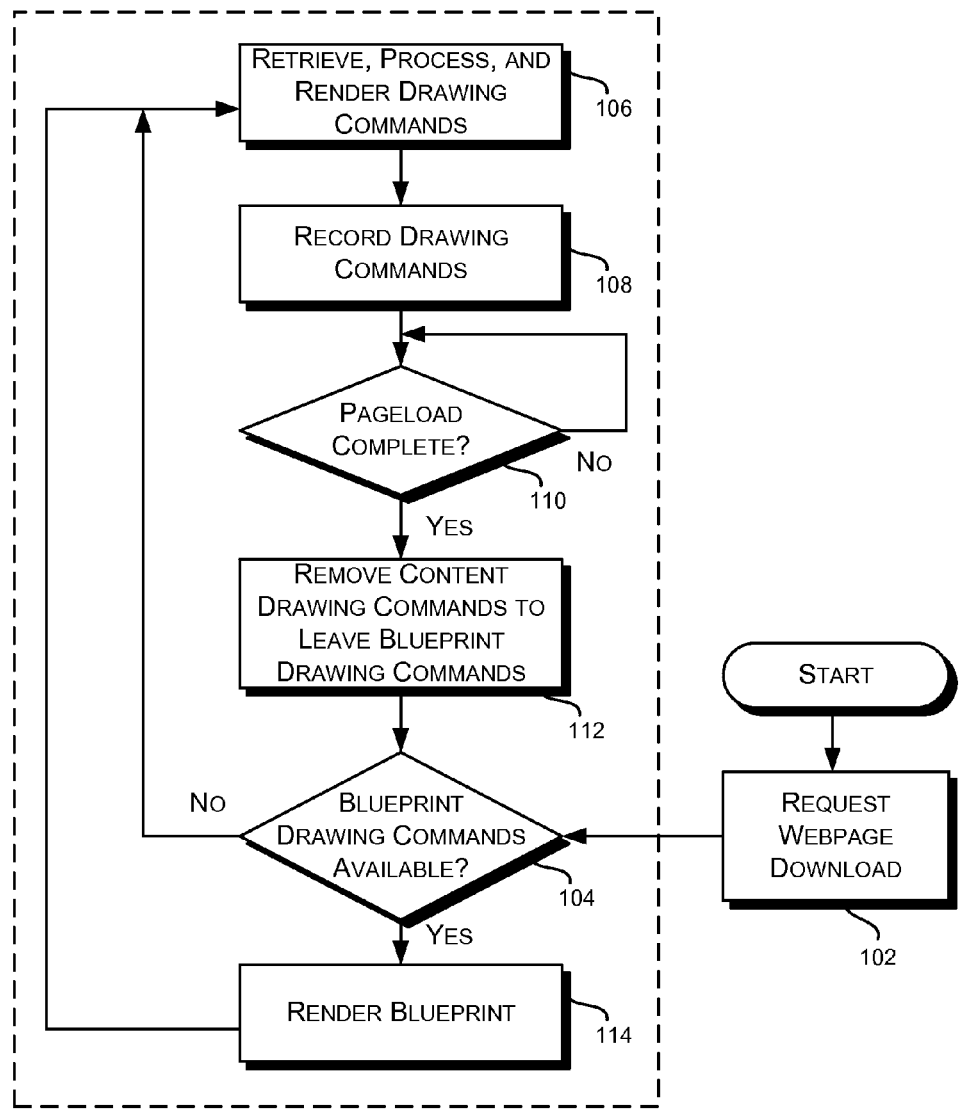
FIG. 1 illustrates a method for creating and utilizing a blueprint in conjunction with the download and rendering of a webpage.

FIG. 1 illustrates a method for creating and utilizing a blueprint in conjunction with the download and rendering of a webpage. A blueprint can be rendered for every webpage download where blueprint drawing commands corresponding to the requested webpage already exist, and if blueprint drawing commands do not exist, then blueprint drawing commands can be created. For a webpage where corresponding blueprint drawing commands do exist, each additional download of the webpage results in an updating to the blueprint drawing commands to account for any changes in the webpage.

In particular, the method begins with a request for download of a webpage operation 102. Typically such a request is followed by the retrieval, processing and rendering of drawing commands for the requested webpage. However, in decision 104 the method instead determines first whether blueprint drawing commands corresponding to the requested webpage exist (e.g., corresponding to a previous download of the requested webpage). If not, then the drawing commands for the requested webpage are retrieved, processed, and rendered in operation 106. As the drawing commands are rendered, they can be recorded via operation 108, for instance to a memory (e.g., cache). When the pageload is completed, as determined by decision 110, drawing commands responsible for drawing content, images (e.g., bitmaps) and text, can be removed in remove operation 112. The remaining drawing commands (or subset of the drawing commands) are referred to herein as blueprint drawing commands, and when rendered in operation 114 they are seen on a display of a user device as a blueprint.

When subsequent requests for download of the webpage are made, the corresponding blueprint drawing commands can be rendered in operation 114 as a blueprint at the same time that the drawing commands are retrieved, processed, and rendered in operation 106. By rendering the blueprint while the slower drawing commands for the unabridged webpage are retrieved, processed, and rendered, the method creates the appearance of a faster load time. This path through the method begins with a subsequent request for the webpage operation 102, and this time the decision 104 finds blueprint drawing commands corresponding to the requested webpage, and thus the method turns to the render blueprint operation 114 before (or alternatively in parallel to) the retrieve, process, and render drawing commands operation 106. As elements of the drawing commands render, the blueprint is gradually replaced with fully-rendered elements of the webpage.

When rendering the drawing commands is complete, as determined by decision 110 (also known as the pageload), the blueprint is no longer visible. Further, the blueprint drawing commands stored in memory can be updated by storing the drawing commands in operation 108 and removing content drawing commands in the remove operation 112 (e.g., images and text), thus leaving updated blueprint drawing commands. The updated blueprint drawing commands can replace or overwrite the original blueprint drawing commands or be stored without overwriting the previous blueprint drawing commands. The recordation of drawing commands in operation 108 can occur during the rendering in operation 106, after the rendering in operation 106, or after it is determined that the pageload is complete via decision 110.

While the method has so far been described for a first request for a webpage download in operation 102 and a subsequent request for the same webpage in operation 102, the request of operation 102 can also be made for other webpages and numerous iterations of each webpage. When a webpage is first loaded, a new blueprint is created. Subsequent pageloads of the same webpage update the blueprint. In this manner, a library of different blueprint drawing commands is created with each blueprint corresponding to different webpages that the device has previously visited.

In some embodiments, each set of blueprint drawing commands can be tagged or stored with an identifier that the decision 104 searches for, thus simplifying the process of finding blueprint drawing commands corresponding to a requested webpage. Such an indicator may also be helpful in instances where different webpages have nearly identical or identical blueprint drawing commands and thus would otherwise be indistinguishable. For instance, some webpages may be constructed from the same webpage design templates, but have different content. The blueprints would thus look identical, and only be distinguishable via an identifier.

The identifiers can be found either in an outgoing request for a webpage or in inbound data packets returned in response to the request. Thus, the blueprint drawing commands available decision 104 can look to an outgoing request for an identifier to match with stored blueprint drawing commands for a previously-downloaded webpage, or to an indicator in incoming data packets. The request may include a domain name, URL, or an IP address, where each of these can be compared to blueprint drawing commands in memory by the decision 104. Alternatively, the request in operation 102 may generate an indicator that can be used to search for corresponding blueprint drawing commands in a memory as part of decision 104.

In instances where the decision 104 is based on data packets received in response to the request in operation 102, drawing commands can be retrieved or extracted from the data packets in operation 106. In some cases, an application processor may first have to process the data packets before the drawing commands can be executed. In instances where the decision 104 is based on an indicator generated by the request in operation 102, retrieval of drawing commands in operation 106 can include retrieval of the data packets from the remote web server hosting the requested webpage.

A blueprint gives a user an idea as to what the webpage will look like before the webpage content is rendered, and appear 'instantaneously' (at least to a human view) since they lack drawing commands that would tax processing or graphics resources. Additionally, blueprints are retrieved from memory (e.g., cache) and therefore do not require processing.

In some embodiments, all blueprint drawing commands can be executed in a single color such that the blueprint has a unified appearance. For instance, the blueprint may be rendered with all blue lines, thus recalling a traditional engineering blueprint. While many webpages use styles to control global attributes of the various drawing commands, blueprints do not utilize styles to control the attributes of drawing commands, and instead set the attributes for each drawing command. Thus, each drawing command can be set use blue lines, for instance.

The request in operation 102 can be made by a user of the user device or autonomously by the user device. For instance, a user may click on a link from one webpage to another or enter a domain name into a web browser search engine, or enter a URL into a web browser URL input box. Automated device requests can be generated, for instance, by independent advertisements on a given webpage, or via other automated functions embedded in a webpage. Media objects embedded in a webpage may automatically make a request for a webpage download in operation 102, for instance, where a music video requests new video content when the video ends.

Processing of drawing commands in operation 106 can include extracting drawing commands from data packets. Processing in operation 106 may include extracting drawing commands from data packets and preparing the drawing commands for execution and rendering. Processing in operation 106 may also include parsing drawing commands, or any other preparation of the drawing commands for rendering.

Rendering drawing commands in operation 106 can include providing data to a graphics driver for rendering to a display, or rendering can include the software and hardware aspects of rendering the drawing commands to a display. In other words the rendering in operation 106 may or may not be limited to software layers, and in some instances can include a combination of software and hardware layers.

The retrieve, process, and render drawing commands operation 106 can begin at the same time that the blueprint begins to render in operation 114. It may also begin slightly after the start of the render blueprint operation 114. Either way, the retrieve, process, and render drawing commands operation 106 operates in parallel with the render blueprint operation 114.

As the drawing commands are rendered in operation 106, or after they are rendered, they can be recorded via operation 108 in a memory. Recording of drawing commands can be performed via functions of a graphics library, herein referred to as drawing command recording functions. For instance, in the Skia library, the skpicture class of functions is one example of drawing command recording functions. In one embodiment, the drawing commands can be stored in cache and then transferred to a longer term memory such as, for example, RAM or a hard drive. Alternatively, the drawing commands can be stored in RAM initially, and then transferred to a hard drive for long term storage. In other words, the drawing commands can be first stored in short-term memory and then stored in long-term memory.

Where the decision 104 finds that no corresponding blueprint drawing commands exist, a new file can be created, and the drawing commands can be recorded therein 108. In one alternative, a new file can be created even where corresponding blueprint drawing commands already exist, and the drawing commands can be recorded to the new file, thus leaving the previous file intact and unmodified. In another alternative, the drawing commands can be recorded in operation 108 to an existing file, thus overwriting at least a portion of existing blueprint drawing commands. The drawing commands recorded by the record operation 108 can be referred to as recorded drawing commands.

The recording operation 108 continues until the page load is complete, as determined by decision 110. At this point the blueprint drawing commands can be created from the recorded drawing commands. This is done by removing content drawing commands from the recorded drawing commands in the remove operation 112. Content drawing commands can include those directed to drawing images and text. In one embodiment, the drawing commands can be parsed and drawing commands related to content can be identified and removed. In one embodiment, the skpicture can be parsed and drawing commands can be removed from the skpicture.

The difference between the drawing commands and the blueprint drawing commands (or a subset of the drawing commands) is that the blueprint drawing commands do not include commands for drawing content (e.g., images and text). Images can be drawn by drawing commands of a graphics library that are responsible for drawing bitmaps, such as, for example, the skpicture class of ANDROID. For instance, DRAW_BITMAP is one image drawing command in the skpicture class. In some embodiments, sprites are considered images. The specific image drawing commands that are removed can vary between coding languages and between different embodiments within each coding language. The following is an exemplary list of image drawing commands that are part of ANDROID's Skia library and that the remove operation 112 may remove from the recorded drawing commands in order to generate blueprint drawing commands: DRAW_BITMAP; DRAW_BITMAP_MATRIX; DRAW_BITMAP_NINE; DRAW_BITMAP_RECT; DRAW_SPRITE. It should be understood that this list is illustrative only, and in other instances greater or fewer drawing commands can be left as part of the blueprint drawing commands.

Text can be drawn by drawing commands in a graphics library that are responsible for drawing letters, numbers, symbols, and other text. For instance, the skpicture class of ANDROID can draw text. The specific text drawing commands that are removed can vary between coding languages and between different embodiments within each coding language. The following is an exemplary list of text drawing commands that are part of ANDROID's Skia library and that the remove operation 112 may remove from the recorded drawing commands in order to generate blueprint drawing commands: DRAW_POS_TEXT; DRAW_POS_TEXT_TOP_BOTTOM; DRAW_POS_TEXT_H; DRAW_POS_TEXT_H_TOP_BOTTOM; DRAW_TEXT; DRAW_TEXT_ON_PATH; and DRAW_TEXT_TOP_BOTTOM. It should be understood that this list is illustrative only, and in other instances more or less text drawing commands can be left as part of the blueprint drawing commands.

The blueprint thus includes visual cues to a webpage such as, for example, frames, layout borders, image borders, textbox borders, etc., but without content. In other words, the blueprint can be considered all visual aspects of a webpage that are not images or text.

When content drawing commands are removed in the remove operation 112, a new file can be created, or in the alternative the resulting blueprint drawing commands can be written to the same file where existing blueprint drawing commands reside, thus overwriting the prior blueprint drawing commands. In this fashion blueprint drawing commands can be updated each time that a webpage is loaded.

Figure 2:
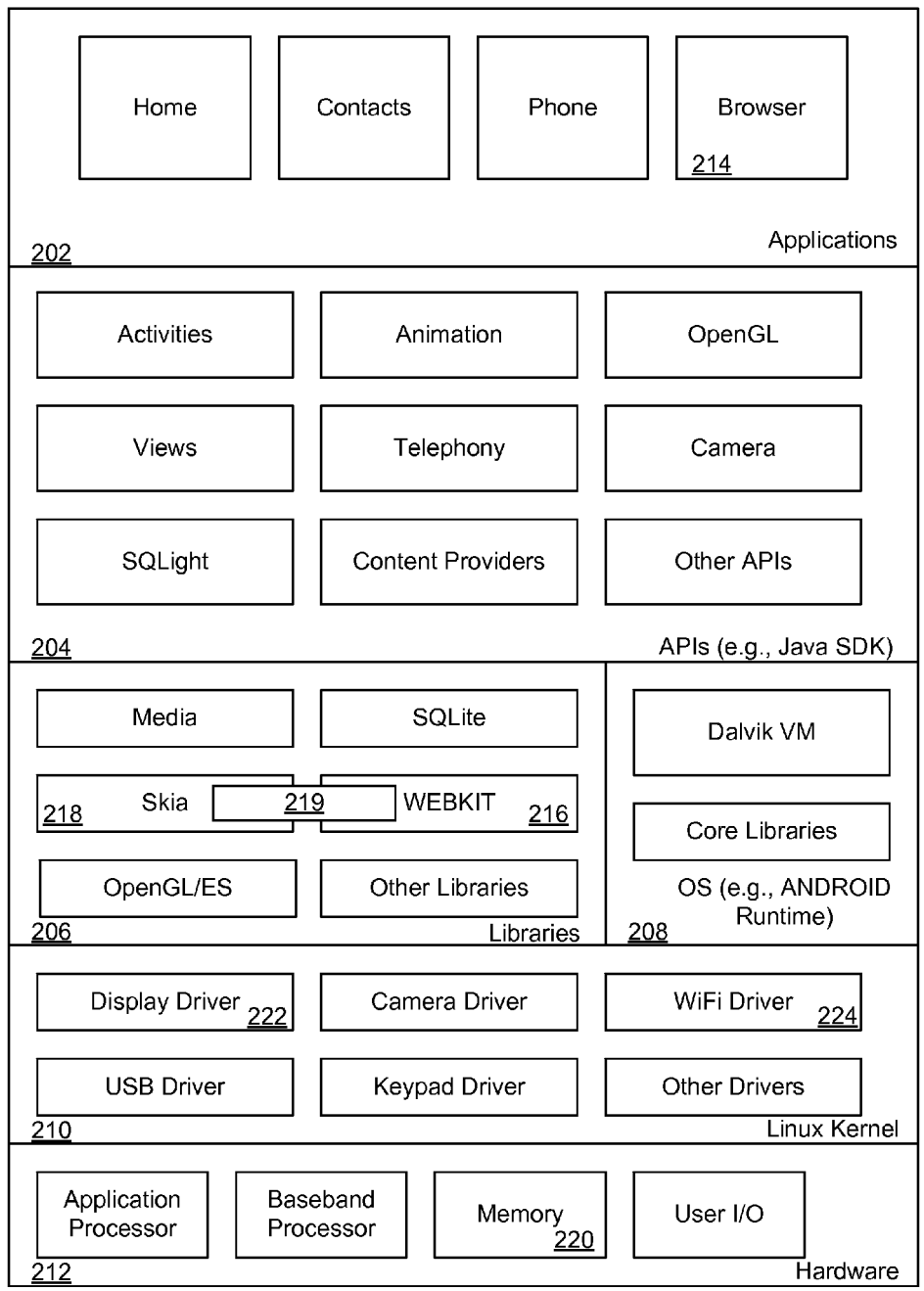
FIG. 2 illustrates one embodiment of the present disclosure as applied to a stack abstraction compatible with ANDROID OS.

FIG. 2 illustrates one embodiment of the present disclosure as applied to a stack abstraction compatible with the ANDROID operating system. This discussion will parenthetically reference the method Blocks of FIG. 1. At the highest abstraction layer, the stack includes applications 202, such as, for example, applications for a homepage of the device, applications for contacts and the phone functionality, and a browser 214 application. The next level of abstraction includes application programming interfaces 204 (APIs) such as, for example, the Java SDK and APIs for animation, telephony, and OpenGL, to name a few. The next level down in the stack includes the OS 208 and libraries 206. The OS can be an ANDROID RUNTIME OS including a Dalvik virtual machine (VM) and core libraries of the OS 208. The libraries 206 can include an OpenGL/ES library, an SQLite library, a WEBKIT library 216 (a specific type of web browser engine library), and a Skia library 218 (a specific type of graphics library). Distributed amongst or between the Skia library 218 and the WEBKIT library 216 is a blueprint control module 219 that carries out some of the functionality described with reference to FIG. 1. Alternatively, the blueprint control module 219 can be distributed between a web browser engine library and a graphics library. Below the layer containing libraries 206 and the OS 208 is a Linux Kernel layer 210 that acts as an intermediary between the OS 208 and a hardware layer 212. The Linux Kernel layer 210 includes drivers such as, for example, those for the display, USB, camera, and WIFI, to name a few. The hardware layer can include hardware components such as, for example, an application processor, a baseband processor, memory, user input/output, and others.

The Linux Kernel layer 210 can include various aspects such as, for example, display drivers, USB drivers, camera drivers, keypad drivers, Bluetooth drivers, WIFI drivers, flash memory drivers, audio drivers, binder (IPC) drivers, and power management drivers, to name a few. The Linux Kernel layer 210 interfaces higher layers of the stack with the hardware layer 212, and hardware such as, for example, the application processor, baseband processor, memory 220, and user input/output, to name a few.

The browser 214 can contact a remote web server and request download of a webpage (Block 102). The request can be made through the WIFI Driver 224 or another network interface of the Linux Kernel layer 210. The blueprint control module 219 can identify the requested webpage either via the request or via data packets of the webpage during download, and then search the memory 220 for a set of blueprint drawing commands corresponding to the requested webpage as previously downloaded (Block 104). If corresponding blueprint drawing commands are found, then the blueprint control module 219 can send the blueprint drawing commands to the display driver 222 for rendering to a display at the same time that a full set of drawing commands for the webpage is downloaded, processed, and sent to the display driver 222 for rendering (Block 106). As the drawing commands are rendered, and gradually replace the blueprint, a function of the Skia library 218 (e.g., skpicture), or any graphics library, can record the drawing commands (Block 108) to the memory 220. In one instance, the drawing commands can be recorded to a file of the memory 220, where the file can contain existing blueprint drawing commands, while in another instance, the drawing commands can be recorded to a new file of the memory 220. When the pageload is completed (Block 110), the blueprint control module 219 can remove drawing commands that are related to drawing images and text (Block 112) from the drawing commands recorded to the memory 220, thus leaving an updated version of the set of blueprint drawing commands in the file. This updated version of the set of blueprint drawing commands is available when another request for the webpage is made and the blueprint control module 219 again searches for blueprint drawing commands corresponding to the same webpage.

In cases where the blueprint control module 219 does not find a set of blueprint drawing commands corresponding to the requested webpage as previously downloaded (Block 104), the blueprint control module 219 can retrieve data packets corresponding to the requested webpage and process and send them to the display driver 222 for rendering (Block 106). A function of the Skia library 218 (e.g., skpicture), or any graphics library, can record the drawing commands (Block 108) to the memory 220. In one instance, a new file can be created and the drawing commands can be recorded to the new file. When the pageload is completed (Block 110), the blueprint control module 219 can remove drawing commands that are related to drawing content (Block 112) (e.g., images and text) from the drawing commands recorded to the memory 220, thus leaving a set of blueprint drawing commands in the new file. This set of blueprint drawing commands is available when the blueprint control module 219 again searches for blueprint drawing commands corresponding to the same webpage.

Figure 3:
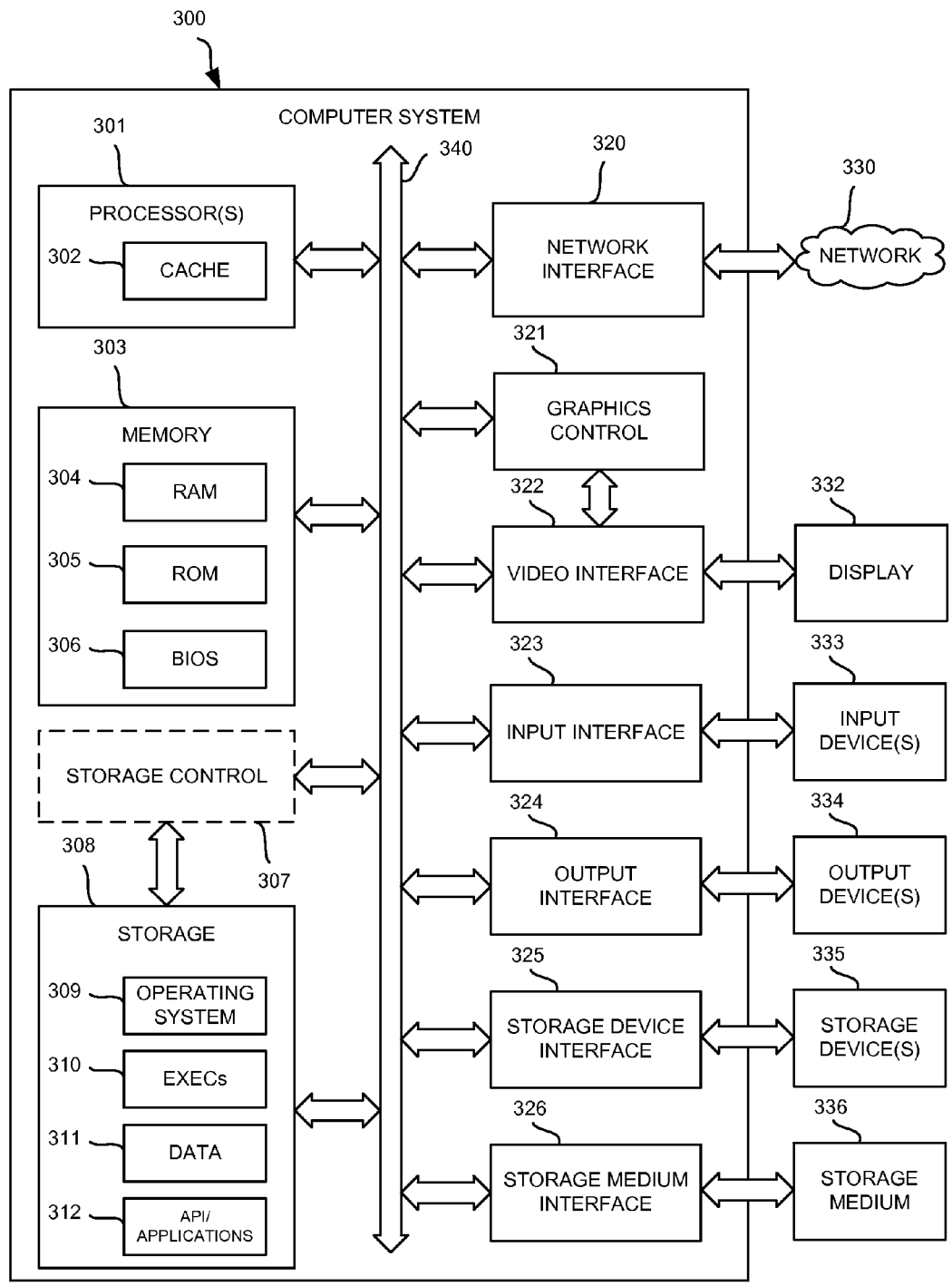
FIG. 3 shows a diagrammatic representation of one embodiment of a machine in the exemplary form of a computer system.

The systems and methods described herein can be implemented in a machine such as a computer system in addition to the specific physical devices described herein. FIG. 3 shows a diagrammatic representation of one embodiment of a machine (e.g., a user device) in the exemplary form of a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

The computer system 300 (or user device) can include computers, laptops, tablet computers, netbooks, ultrabooks, smartphones, media phones, and cellular telephones, to name just a few non-limiting examples.

Computer system 300 may include a processor 301, a memory 303 (e.g., 220), and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as, for example, mobile telephones, smartphones, tablet computers, or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses (e.g., 220). For instance, the cache memory unit 302 may store blueprint drawing commands. Processor(s) 301 are configured to assist in execution of computer readable instructions. Computer system 300 may provide functionality as a result of the processor(s) 301 executing software embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as, for example, mass storage device(s) 335, 336) or from one or more other sources through a suitable interface, such as network interface 320. The software may cause processor(s) 301 to carry out one or more processes or one or more steps of one or more processes described or illustrated herein. For instance, the software may cause processor(s) 301 to retrieve, process, and send to the video interface, drawing commands. Carrying out such processes or steps may include defining data structures stored in memory 303 and modifying the data structures as directed by the software. For instance, drawing commands may be stored in memory 303, and can be modified via the removal of drawing commands related to images, text, JAVASCRIPT, and styles. Also, the processor(s) 301 may execute or partially execute many of the functions described with reference to FIG. 1 and the blueprint control module 219.

The memory 303 may include various components (e.g., machine readable media) including, but not limited to, a random access memory component (e.g., RAM 304) (e.g., a static RAM "SRAM", a dynamic RAM "DRAM", etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECs 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a touch-sensitive display, a joystick, a gamepad, an audio input device (e.g., a microphone, a voice recognition system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. For instance, data packets representing a webpage may be received from a remote web server. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network (wired, wireless, or a combination of the two), a direct connection between two computing devices, and any combinations thereof. A network, such as network 330, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321. For instance, the graphics control 321 can be partially responsible for the rendering, Block 106, illustrated in FIG. 1.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition or as an alternative, computer system 300 may provide functionality as a result of logic hardwired or otherwise embodied in a circuit, which may operate in place of or together with software to execute one or more processes or one or more steps of one or more processes described or illustrated herein. For instance, the algorithm that performs the search for corresponding blueprint drawing commands decision 104 may be hardwired or otherwise embodied in a circuit. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A user device comprising:
    a network interface that receives data packets corresponding to a webpage in response to a first request for a frame of the webpage;
    a display that displays the frame of the webpage;
    a memory buffering a plurality of blueprint drawing commands, wherein one set of blueprint drawing commands includes only a structure of the webpage as previously buffered, the structure excluding images and text; and
    a blueprint control module distributed between a Skia library and a graphics library that:
        processes drawing commands extracted from the data packets;
        renders the drawing commands to the display;
        buffers the drawing commands to the memory to form buffered drawing commands; and then
        removes drawing commands for all images and text from the buffered drawing commands in the memory to leave a subset of the buffered drawing commands, and wherein drawing commands are not copied to a new buffer as part of removal;

accesses the buffered drawing commands from the memory in response to a second request for the frame of the webpage;

renderss to the display only the structure, at a first time, via executing the set of blueprint drawing commands corresponding to the structure such that the images and text of the webpage are not visible, renders to the display a remainder of the webpage subsequent to the first time.

2. The system of claim 1, wherein drawing command recording functions of the graphics library record the drawing commands as they are rendered.

3. The system of claim 2, wherein one or more of the following drawing commands for images and text are removed from the drawing commands to form the updated set of blueprint drawing commands: DRAW_BITMAP; DRAW_BITMAP_MATRIX; DRAW_BITMAP_NINE; DRAW_BITMAP_RECT; DRAW_SPRITE; DRAW_POS_TEXT; DRAW_POS_TEXT_TOP_BOTTOM; DRAW_POS_TEXT_H; DRAW_POS_TEXT_H_TOP_BOTTOM; DRAW_TEXT; and DRAW_TEXT_ON_PATH; DRAW_TEXT_TOP_BOTTOM.

4. The system of claim 1, wherein the set of blueprint drawing commands corresponding to the structure is rendered to the display in less time than it takes to process and render the drawing commands.

5. The system of claim 1, wherein the webpage as previously downloaded is identical to the webpage.

6. The system of claim 1, wherein the webpage as previously downloaded is different from the webpage.

7. The system of claim 1, wherein the user device autonomously makes the request.

8. The system of claim 1, wherein the memory is cache.

9. The system of claim 1, wherein the memory is RAM.

10. The system of claim 1, wherein the memory is a combination of cache and RAM.

11. The system of claim 1, wherein the blueprint control module is distributed between a graphics library and a browser engine library.

12. A method of downloading webpages to a user device, the method comprising:

receiving first data packets corresponding to a webpage in response to a first request for the webpage;

searching for corresponding blueprint drawing commands in a memory of the user device, wherein the blueprint drawing commands include a structure of the webpage as previously downloaded, but exclude images and text;

determining that the corresponding blueprint drawing commands do not exist in the memory;

processing first drawing commands from the first data packets;

rendering the first drawing commands to a display of the user device;

recording the first drawing commands to the memory; and removing drawing commands for all images and text from the first drawing commands in the memory to leave the corresponding blueprint drawing commands in the same buffer, and wherein drawing commands are not copied to a new buffer as part of removal, wherein the corresponding blueprint drawing commands, when executed, will render lines of a single color that outline areas where text and images of the webpage are to be rendered, but no images or text are rendered, the blueprint drawing commands to be rendered as a precursor to rendering of the whole webpage.

13. The method of claim 12, further comprising:

receiving second data packets corresponding to the webpage in response to a second request for the webpage;

searching for the corresponding blueprint drawing commands in the memory of the user device;

determining that the corresponding blueprint drawing commands exist in the memory;

accessing the corresponding blueprint drawing commands from the memory; and rendering the corresponding blueprint drawing commands to the display of the user device.

14. The method of claim 13, further comprising:

processing second drawing commands from the second data packets; and rendering the second drawing commands to the display.

15. The method of claim 14, wherein the processing of the second drawing commands occurs in parallel to displaying of the corresponding blueprint drawing commands.

16. The method of claim 15, wherein the rendering of the second drawing commands completes after the rendering of the corresponding blueprint drawing commands.

17. The method of claim 14, wherein the rendering of the second drawing commands occurs after the rendering of the corresponding blueprint drawing commands.

18. The method of claim 14, further comprising updating the corresponding blueprint drawing commands by:

recording the second drawing commands to the memory; and removing drawing commands for images, text, and CSS styles from the second drawing commands to leave the corresponding blueprint drawing commands.

19. A non-transitory, tangible computer readable storage medium, encoded with processor readable instructions to perform a method for downloading webpages to a user device, the method comprising:

receiving first data packets corresponding to a webpage in response to a first request for the webpage;

searching for blueprint drawing commands in a memory of the user device, the blueprint drawing commands corresponding to a blueprint of the webpage, the blueprint comprising visual cues to the webpage and excluding images and text;

determining that the blueprint drawing commands do not exist in the memory;

processing first drawing commands from the first data packets;

rendering the first drawing commands to a display of the user device;

recording the first drawing commands to the memory; and removing drawing commands for all images and text from the first drawing commands, and wherein drawing commands are not copied to a new buffer as part of removal, to leave a subset of the first drawing commands, the subset being referred to as an updated set of blueprint drawing commands, the updated set of blueprint drawing commands being rendered to a display while drawing commands for an entirety of the webpage are rendered.

20. The non-transitory, tangible computer readable storage medium of claim 19, wherein the images include bitmaps.

21. The non-transitory, tangible computer readable storage medium of claim 19, further comprising creating a file in the memory in which the first drawing commands are recorded.

22. The non-transitory, tangible computer readable storage medium of claim 19, further comprising accessing the blueprint drawing commands in the memory and rendering the blueprint drawing commands in response to a second request for the webpage while second drawing commands extracted from a second set of data packets received in response to the second request for the webpage are processed, rendered, and recorded to the memory.

23. A system comprising:
- means for receiving data packets corresponding to a webpage in response to a request for the webpage;
- means for searching for corresponding blueprint drawing commands in a memory of the user device;
- means for determining that the corresponding blueprint drawing commands exist in the memory;
- means for rendering the corresponding blueprint drawing commands to a display of the user device;
- means for processing drawing commands extracted from the data packets;
- means for rendering the drawing commands to the display;
- means for recording the drawing commands to the memory; and
- means for removing all images and text drawing commands from the memory to leave updated blueprint drawing commands that are devoid of drawing commands for images and text.

24. The non-transitory, tangible computer readable storage medium of claim 19, wherein the blueprint drawing commands include one or more selected from the group consisting of: frames, layout borders, image border, and textbox borders.

25. The non-transitory, tangible computer readable storage medium of claim 19, wherein the drawing commands include all visual aspects of a webpage that are not images or text.

26. The method of claim 12, wherein the single color is blue.

27. The method of claim 26, wherein the color is set as an attribute of the drawing command rather than via styles.

* * * * *